Figure 1:
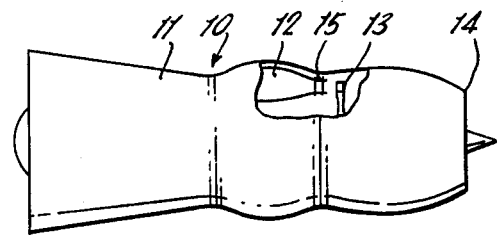

United States Patent [19]
Dodd

[11] 4,105,364
[45] Aug. 8, 1978

[54] VANE FOR A GAS TURBINE ENGINE HAVING MEANS FOR IMPINGEMENT COOLING THEREOF

[75] Inventor: Alec George Dodd, Belper, England

[73] Assignee: Rolls-Royce Limited, London, England

[21] Appl. No.: 748,289

[22] Filed: Dec. 7, 1976

[30] Foreign Application Priority Data

Dec. 20, 1975 [GB] United Kingdom ............... 52293/75

[51] Int. Cl.² .............................................. F01D 5/18
[52] U.S. Cl. ............................ 416/97 R; 416/96 A; 415/115
[58] Field of Search ................... 416/97, 96, 95, 96 A; 165/DIG. 11, 168; 415/116, 115

[56] References Cited

U.S. PATENT DOCUMENTS

| | | | |
|---|---|---|---|
| 2,657,531 | 11/1953 | Pierce | 416/96 A UX |
| 2,919,549 | 1/1960 | Haworth et al. | 416/96 X |
| 3,032,314 | 5/1962 | David | 416/96 |
| 3,584,972 | 6/1971 | Bratkovich et al. | 416/229 |
| 3,620,643 | 11/1971 | Jones | 416/96 X |
| 3,700,348 | 10/1972 | Corsmeir et al. | 416/96 |
| 3,781,129 | 12/1973 | Aspinwall | 416/96 |
| 3,806,276 | 4/1974 | Aspinwall | 416/97 |
| 3,846,041 | 11/1974 | Albani | 416/96 |
| 3,864,199 | 2/1975 | McGinnis | 416/97 X |

FOREIGN PATENT DOCUMENTS

2,555,814  6/1976  Fed. Rep. of Germany ............ 416/96

Primary Examiner—Everette A. Powell, Jr.
Attorney, Agent, or Firm—Cushman, Darby & Cushman

[57] ABSTRACT

A vane for directing hot gases of a gas turbine engine and comprising at least one platform and a hollow aerofoil portion having an air entry tube extending spanwise therein, the tube being provided with a plurality of apertures, the size and the spacing therebetween being chosen to cause cooling fluid to impinge on the interior surface of the aerofoil portion in the form of a plurality of jets. A plurality of columnar projections extend between the interior surface of the aerofoil portion and the exterior of the air entry tube, each projection being positioned directly upstream of one of the apertures in the air entry tube with respect to the general flow of impinged fluid in the space between the interior surface of the aerofoil portion and the exterior of the air entry tube.

4 Claims, 4 Drawing Figures

VANE FOR A GAS TURBINE ENGINE HAVING MEANS FOR IMPINGEMENT COOLING THEREOF

This invention relates to means for cooling a vane used for direction of hot gases in a gas turbine engine and, more particularly, to the cooling of the interior surface of a hollow aerofoil portion of the vane by the impingement of a cooling fluid.

It should be noted that the surface which is directly cooled in this way may not necessarily be the surface exposed to the hot gases of the engine, but it would normally be in thermal contact with such a surface; for example the cooled surface may be that one of the two surfaces of a thin sheet or like member not exposed to the hot gas.

One of the known ways of using fluid to cool a surface is termed 'impingement cooling', and consists basically of using an apertured plate spaced from the surface, cooling fluid being supplied to the face of the plate remote from the surface being cooled, and the size of the apertures in the plate and its spacing from the surface being chosen to cause the cooling fluid to impinge on the surface in the form of a plurality of jets. These jets penetrate the boundary layer on the surface and provide effective cooling thereof. However, the impinged fluid has to flow away, at least between some parts of the plate and surface, to be disposed of, and this general flow of impinged fluid may interfere with the jets of fluid from the plate and affect their efficiency.

The present invention provides a way in which the deleterious effect of this flow may be reduced.

According to the present invention, means for cooling a surface by the impingement of cooling fluid comprises an apertured impingement plate spaced from said surface, the size of the apertures and the amount of said spacing being chosen to cause the cooling fluid to impinge on the surface in the form of a plurality of jets, and a plurality of columnar projections extending between the plate and the surface, each projection being positioned directly upstream of one said aperture with respect to the direction of general flow of impinged fluid between the plate and the surface.

Preferably each said projection has its surface flattened or indented on that side which faces the axis of its respective aperture, whereby the accuracy of alignment between the aperture and the projection necessary to provide the beneficial effect is reduced.

Each said projection may be a substantially cylindrical member having a flattened face.

Said projections and apertures may be laid out in staggered rows.

The cooling means of the invention is particularly useful in the cooled vanes and blades of a gas turbine engine.

Figure 2:
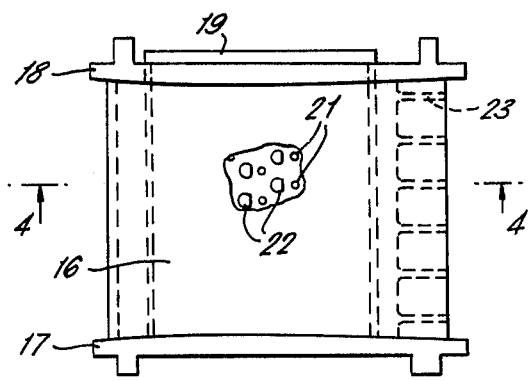
Figure 3:
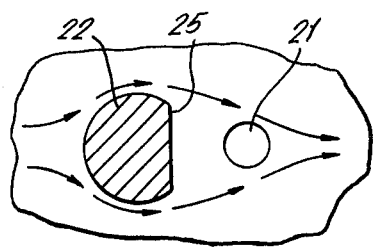
Figure 4:
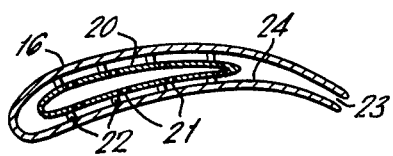

The invention will now be particularly described, merely by way of example, with reference to the accompanying drawings in which:

FIG. 1 is a partly broken-away side elevation of a gas turbine engine having cooling means in accordance with the invention, FIG. 2 is a view of a vane of the engine of FIG. 1, broken-away to show the cooling means, FIG. 3 is an enlarged view of the cooling means of FIG. 2, and FIG. 4 is a section on the line 4—4 of FIG. 2.

In FIG. 1 there is shown a gas turbine engine 10 having a casing within which are disposed in flow series, a compressor 11, combustion system 12, turbine 13 and terminating in a propulsion nozzle 14. The casing is broken-away to show part of the combustion system, and the nozzle guide vanes 15 which direct the hot gases from the combustion chamber on to the rotor blades of the turbine 13. Because they are used to direct the hot gases, the vanes 15 are provided with cooling means, and this is shown in more detail in FIGS. 2-4.

As can be seen in FIG. 2 each vane 15 comprises a hollow aerofoil portion 16 which extends between inner and outer platforms 17 and 18. Entry of cooling air, which is bled from the compressor, to the interior of the hollow aerofoil is permitted by an aperture 19 in platform 18. Referring to FIG. 4, it will be seen that the hollow interior of the aerofoil is provided with an air entry tube 20 which extends from the air entry aperture substantially to the other end of the aerofoil.

The air entry tube 20 is provided with a plurality of small apertures 21 which allow cooling air to impinge on the inside surface 24 of the hollow aerofoil in the form of a plurality of jets and thus to provide impingement cooling of the inner surface of the hollow vane. It should be noted that although the surface actually impingement cooled in this way is the inner surface of the vane, conductive heat transfer through the thin wall of the vane makes this cooling apply to the outer surface as well. The tube 20 is spaced from the inner surface 24 of the aerofoil by a plurality of pedestals or pin fins 22.

The pedestals or pin fins comprise small columnar projections of substantially constant cross-section which extend across the cooling air passage between and substantially perpendicular to the plate and the surface; normally these pedestals are of circular cross-section, but in this embodiment, as described below, the section is modified.

Once the cooling air has impinged on the inner surface 24 of the aerofoil it flows generally rearwardly in the space between the tube and the aerofoil to the trailing edge, where it leaves the vane through trailing edge exhaust slots 23. The pedestals 22 are carefully positioned so that each lies just upstream of a corresponding one of the holes 21 so that the hole and the jet which issues from it lie in the lee of the pedestal and the jet is therefore protected from the effect of the general impinged airflow.

It will be appreciated that the relative closeness of the holes 21 and their respective pedestals 22 will be determined by the sizes and flows involved, but that to ensure effective operation, the hole must be inside the wake produced by the pedestal. We have found that using normal circular section or similar pedestals this wake is so narrow as to require extreme accuracy in the relative positioning of the pedestals and holes, and this may be difficult to achieve in manufacture. Therefore, the pedestals 22 shown in this embodiment have a modified shape which we have found increases the size of the wake to a considerable degree.

As can be best seen in FIG. 3, the modification to the section of the pedestals simply consists of providing a flat side 25 thereon which faces the axis of its corresponding hole. This modified section is very simple to produce, and although it is possible that other modified shapes such as a crescent section or a circular section having a concave face which faces the hollow might be aerodynamically better we believe that the flat face provides an optimum in effectiveness and ease of manufacture. It would however be possible to use other shapes such for instance as rectangular or triangular.

It will also be seen from FIG. 2 that the apertures and projections are set out in staggered rows. This provides advantages in maintaining a consistent degree of cooling over the surface and in providing a relatively long flow path between successive projections.

It will be appreciated that although as described above the cooling means of the invention is applied to the air cooling of the whole aerofoil of the vane of a gas turbine engine, it will be quite possible to apply it to other areas needing cooling, not necessarily even in a gas turbine engine, nor even using air as coolant. However, in such an engine we would expect the invention to be particularly applicable in cooling turbine rotor blades and stator blades and their shrouds and platforms.

I claim:

1. A vane for directing hot gases in a gas turbine engine comprising: at least one platform; a hollow aerofoil portion extending from said platform and having an exterior surface for contacting and directing the hot gases and an interior surface; means for impingement cooling of the interior surface of the hollow aerofoil portion of said vane, said impringement cooling means including a cooling fluid entry tube extending within and generally spanwise of said aerofoil portion of the vane and spaced from the interior surface thereof, said cooling fluid entry tube having a plurality of apertures therein for directing jets of impingement cooling fluid onto the interior surface of the aerofoil portion; at least one exhaust slot on the trailing edge of said aerofoil portion, said at least one slot setting up a general flow path of cooling fluid in the space between the internal surface of said aerofoil portion and the cooling fluid entry tubes exterior and then exhausting the same to the exterior of the aerofoil portion; and a plurality of columnar projections extending between the interior surface of the aerofoil portion and the cooling fluid entry tubes exterior, each projection being positioned directly upstream of one of said apertures with respect to said general flow path of cooling fluid in the space between the internal surface of said aerofoil portion and the cooling fluid entry tubes exterior so that the jet of cooling fluid entering the space lies in a zone of separation of flow behind the projection whereby the jet of cooling fluid entering through the aperture is undisturbed by the general flow path of the cooling fluid in the space between the interior surface of the aerofoil portion and the cooling fluids exterior.

2. A vane as claimed in claim 1 and in which each said columnar projection has its surface flattened or indented on that side which faces the axis of its respective aperture.

3. A vane as claimed in claim 2 and in which each said columnar projection comprises a substantially cylindrical member having a flattened face which faces the axis of its respective aperture.

4. A vane as claimed in claim 1 and in which said projections and apertures are laid out in staggered rows.

* * * * *